3,404,187
ETHERS OF HYDROXYALKYL PHOSPHINE OXIDES AND THE PREPARATION THEREOF
Ehrenfried H. Kober and Gerhard F. Ottmann, Hamden, Conn., assignors to Olin Mathieson Chemical Corporation, a corporation of Virginia
No Drawing. Filed Mar. 10, 1965, Ser. No. 438,728
7 Claims. (Cl. 260—606.5)

ABSTRACT OF THE DISCLOSURE

Ethers of hydroxyalkyl phosphine oxides are prepared by reacting tris(hydroxymethyl-phosphine oxide with glycidol in the presence of a condensing catalyst, such as a Friedel-Crafts catalyst. The molar ratio of glycidol to said phosphine oxide is in the range of about 2.1:1 and about 15:1. Compounds of this type are useful as polyols in the preparation of polyurethane foams and resins, and as a fluid base stock for fire resistant, water-base, hydraulic fluids.

---

This invention relates to the preparation of ethers of hydroxyalkyl phosphine oxides. More particularly, this invention relates to the reaction products of hydroxy-substituted epoxides and hydroxyalkyl phosphine oxides.

Extensive efforts have recently been made to prepare organic polyhydroxy phosphorus compounds which are suitable for use as a reactant in the preparation of polyurethane foams and resins which are flame resistant. In addition, phosphorus-based polyols have been studied for use as fluid base stock for fire-resistant, water-base, hydraulic fluids.

It is a primary object of this invention to provide improved phosphorus-based polyols useful as a reactant in the preparation of polyurethane foams and resins, and as a fluid base stock for fire-resistant, water-base, hydraulic fluids.

It is another object of this invention to provide novel organic phosphorus compounds.

Still another object of the invention is to provide a process for preparing ethers of alkoxy phosphine oxides.

These and other objects of the invention will be apparent from the following detailed description thereof.

It has now been discovered that the foregoing objects are accomplished by reacting a hydroxyalkyl phosphine oxide, such as tris(hydroxymethyl)phosphine oxide, with a hydroxy-substituted epoxide in the presence of a catalytic proportion of a condensing catalyst, and recovering the resulting condensation product, a polyether polyol of the hydroxyalkyl phosphine oxide, produced thereby.

In more detail, any hydroxyalkyl phosphine oxide capable of condensing with a hydroxy-substituted epoxide may be employed as a reactant in the novel process of this invention. It is preferred to employ tris(hydroxymethyl)phosphine oxide as the hydroxyalkyl phosphine oxide reactant, but other suitable compounds include tris(hydroxyethyl)phosphine oxide, bis(hydroxymethyl)hydroxyethyl phosphine oxide, bis(hydroxyethyl)hydroxymethyl phosphine oxide, mixtures thereof and the like.

Hydroxy-substituted epoxides suitable for use as a reactant in the novel process of this invention are represented by the formula:

(I) 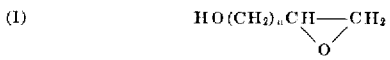

where $n$ is an integer in the range between about 1 and 5. It is preferred to employ glycidol as the epoxy compound, but other epoxy compounds represented by Formula I may also be employed.

The proportion of hydroxy-substituted epoxide to hydroxyalkyl phosphine oxide employed in the novel process is generally equivalent to a molar ratio in the range between about 2.1 and about 15 moles, and preferably between about 2.7 and about 9.3 moles of the epoxide per mole of the phosphine oxide. When preparing a monoether in which the secondary hydroxy alkoxy moiety is about three times the molar proportion of phosphine oxide, it is preferred to employ between about 2.7 and about 3.3 moles of epoxide per mole of phosphine oxide. However, when a polyether is desired, the epoxide proportion is revised accordingly. For example, when it is desired to prepare a polyether in which the secondary hydroxy alkoxy moiety is about nine times the molar proportion of phosphine oxide, it is preferred to employ between about 8.7 and about 9.3 moles of epoxide per mole of phosphine oxide.

The reaction is carried out in the presence of a catalytic proportion of a condensing catalyst. Typical catalysts are those of the Friedel-Crafts type, including anhydrous $AlCl_3$, $BF_3$, $ZnCl_2$, $FeCl_3$, $SnCl_4$, and complexes such as the well known $BF_3$ etherates, etc.; acid type catalysts including HF, $H_2SO_4$, $H_3PO_4$, etc.; basic type catalysts such as NaOH, KOH, sodium methoxide, sodium acetate, etc.; others such as $SbCl_5$, etc., mixtures thereof and the like. Concentration of catalyst may be varied, depending upon the individual catalyst. For example, from about 0.2 percent to about 4 percent of $BF_3$ or a complex thereof, based upon the total quantity of reactants, provide satisfactory results. With certain of the less active catalysts, i.e., $SbCl_5$, etc., larger amounts may be used to advantage. Basic catalysts such as NaOH are added to provide between about 1 percent and 2 percent by weight of the reactants.

The reaction is generally carried out at a temperature in the range between about 70° C. and about 150° C., and preferably between about 80 and about 125° C. The reaction pressure is not critical and the reaction may be carried out under subatmospheric, atmospheric or superatmospheric pressure.

The reaction period will depend upon various factors, which include the reactants, the catalysts, the concentrations of each, and the temperature conditions.

The basic reaction between the hydroxyalkyl phosphine oxide and the epoxide is illustrated by Equation II, using tris(hydroxymethyl)phosphine oxide and glycidol as the reactants:

II

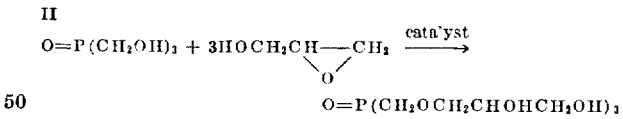

The reaction is preferably carried out in the absence of a solvent, but solvents which act as diluents may be employed. Suitable solvents include the dialkyl ethers of polyethylene glycol.

The tris(2,3-dihydroxypropoxymethyl)phosphine oxide of this invention, when reacted with an organic diisocyanate in the presence of a catalyst and foaming agent, forms polyurethane foams which are flame retardant due to the chemically combined phosphorus component of the compound. Unfoamed resinous reaction products formed by this reaction are also flame retardant.

The compounds also have a high fire point, generally above 500° F., which renders them suitable for use a a fluid base for fire resistant, water-base, hydraulic fluids.

The following examples are presented to define the invention more fully without any intention of being limited thereby.

EXAMPLE I

To a 200 ml., 3-neck round bottom flask equipped with a stirrer, thermometer, dropping funnel, condenser, and drying tube, was added 25 g. (0.177 mole) of tris(hydroxymethyl)phosphine oxide. The system was purged with dry nitrogen for five minutes and 2.5 g. of boron trifluoride etherate was added. The flask was heated in an oil bath with stirring to 95° C., at which time a total of 43.0 g. (0.58 mole) of gylcidol was added dropwise to the stirred melt over a period of 1.25 hours. The temperature was maintained at 95–100° C. The mixture was held at 100° C. for an additional one hour after completion of addition. The viscous, white, reaction product was subjected to a vacuum of .5 mm. at a pot temperature of 120° C. for two hours to remove boron trifluoride etherate, taken up in 200 ml. of hot water and stirred with 5 g. of decolorizing charcoal for one-half hour. This hot mixture was filtered; the clear, colorless, filtrate being concentrated on a rotary film evaporator at 100° C./.5 mm. for 2 hrs. to yield 58.5 g. of clear, colorless fluid ($n_D^{25°C.}=1.5080$).

Analysis for:

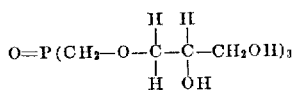

Theoretical: C, 39.8; H, 7.45; P, 8.56. Found: C, 38.63; H, 7.77; P, 7.95.

Hydroxy number—Theory: 928, Found: 866.

Analysis indicated that the product had the theoretical structure indicated above.

EXAMPLE II

An aqueous solution of 70 percent (by weight) of the composition of Example I was prepared. The following physical properties were determined.

Property:
    Viscosity at 25° F. _____cs__ 652
    Viscosity at 100° F. _____cs__ 52
    Pour point _____° F__ Below 0
    Fire point _____° F__ Above 500

These results demonstrate the excellent fire resisting properties of the fluid.

EXAMPLE III

To a mixture of 35.0 g. (0.25 mole) of tris(hydroxymethyl)phosphine oxide and 1.0 g. of potassium hydroxide was added 166.5 g. (2.25 moles( of glycidol while the temperature of the reaction mixture was controlled between 115 and 120° C. The reaction mixture was thereafter treated as described in Example I affording 198.1 g. of a clear, colorless fluid having a molecular weight of 818 (theoretical: 806) and a hydroxyl number of 822 (theoretical: 835). These values are in agreement with the following structure:

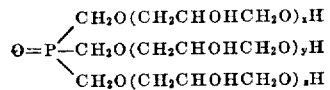

wherein $x$, $y$, and $z$ each are integers of 1 to 7, equal or different from each other, and the total of $x$, $y$, and $z$ is 9.

Various modifications of the invention, some of which have been referred to above, may be employed without departing from the spirit of the invention.

What is desired to be secured by Letters Patent is:

1. The process for preparing organic phosphorus ethers which comprises reatcing tris(hydroxymethyl)phosphine oxide with glycidol in the presence of a catalytic proportion of a condensing catalyst, the proportion of glycidol being equivalent to a molar ratio of glycidol to said phosphine oxide in the range of about 2.1:1 and about 15:1, and recovering the organic phosphorus ether produced thereby.

2. The process of claim 1 where tris(hydroxymethyl) phosphine oxide is reacted with glycidol at a temperature in the range between about 70 and about 150° C.

3. The process of claim 1 wherein said condensing catalyst is boron trifluoride etherate, and the catalytic proportion is in the range between about 0.2 percent and about 4 percent by weight of the total weight of said phosphine oxide and glycidol.

4. The process of claim 1 wherein the molar ratio of glycidol to said phosphine oxide is in the range between about 2.7:1 and about 3.3:1, wherein the reaction temperature is in the range between about 80 and about 125° C., and said condensing catalyst is boron trifluoride etherate in a proportion in the range between about 0.2 percent and about 4 percent by weight of the total weight of glycidol and said phosphine oxide.

5. The process of claim 1 wherein said condensing catalyst is potassium hydroxide, and the catalytic proportion is in the range between about 0.2 percent and about 4 percent by weight of the total weight of said phosphine oxide and gylcidol.

6. The process of claim 1 wherein the molar ratio of glycidol to said phosphine oxide is in the range between about 8.7:1 and about 9.3:1, wherein the reaction temperature is in the range between about 80 and about 125° C., and said condensing catalyst is potassium hydroxide in a proportion in the range between about 0.2 percent and about 4 percent by weight of the total weight of glycidol and said phosphine oxide.

7. A composition having the formula

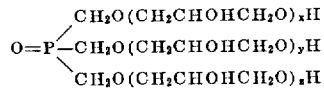

wherein $x$, $y$, and $z$ each are integers of 1 to 7, equal or different from each other, and the total of $x$, $y$, and $z$, is 9.

References Cited

UNITED STATES PATENTS 3,248,429    4/1966    Baranauckas et al. __ 260—606.5

FOREIGN PATENTS 816,069    7/1959    Great Britain.

TOBIAS E. LEVOW, *Primary Examiner.*

W. F. W. BELLAMY, *Assistant Examiner.*